Jan. 4, 1966  S. GODEL ET AL  3,227,153
SOLAR COLLECTOR
Filed Sept. 4, 1963  3 Sheets-Sheet 3
FIG. 10
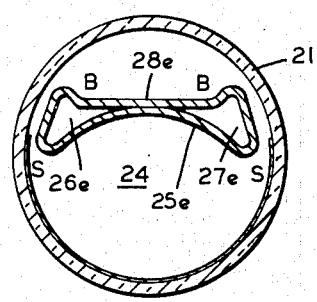
FIG. 8
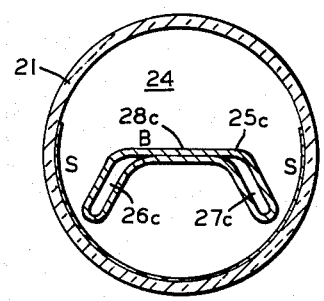
FIG. 9
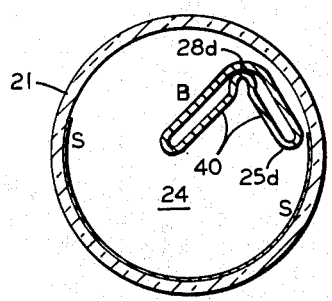
FIG. 7
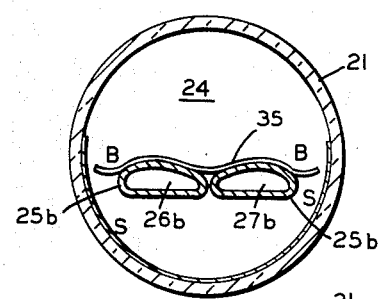
FIG. 11
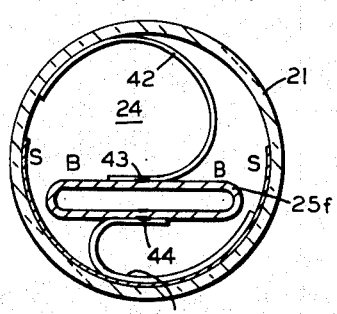
FIG. 12
FIG. 13
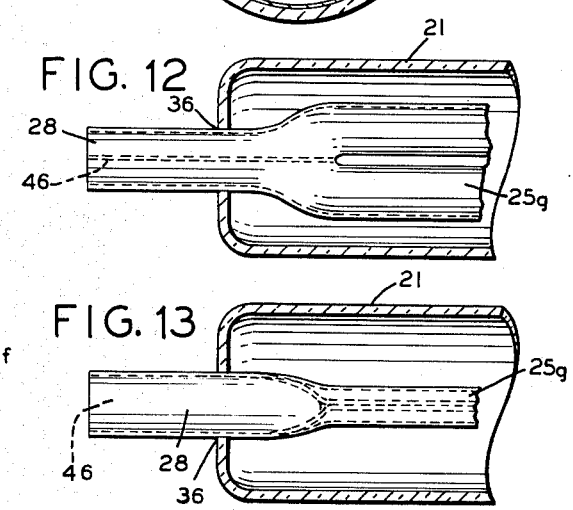
INVENTORS.
EDWARD SPEYER
SIEGFRIED GODEL
BY
ARTHUR J. PLANTAMURA
ATTORNEY.

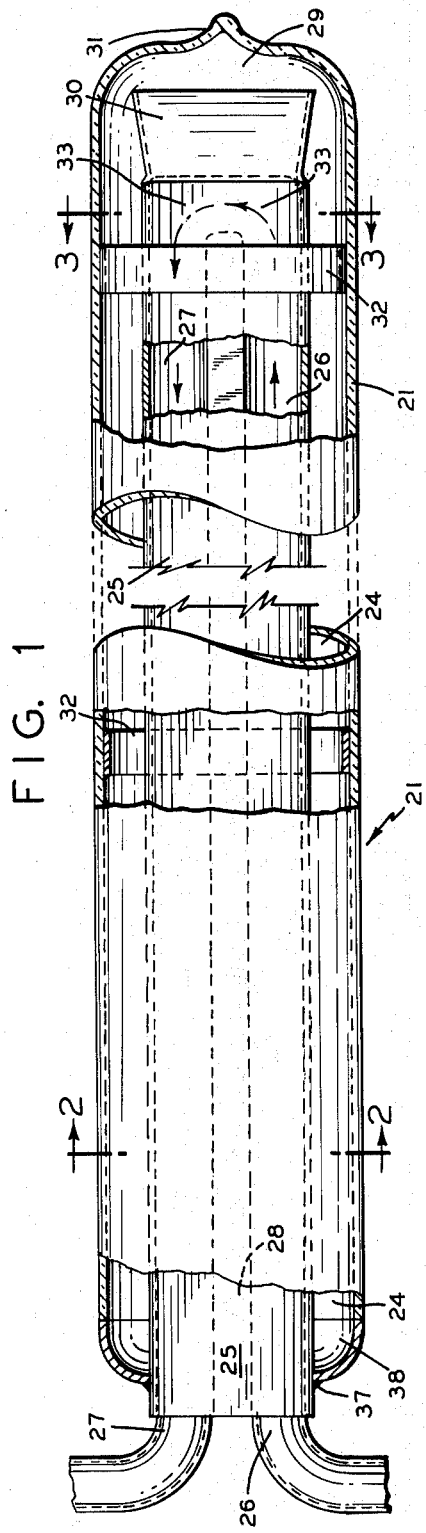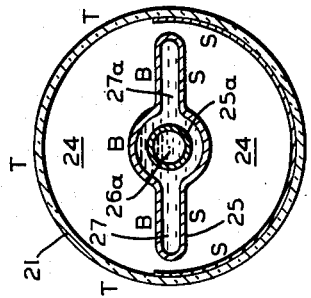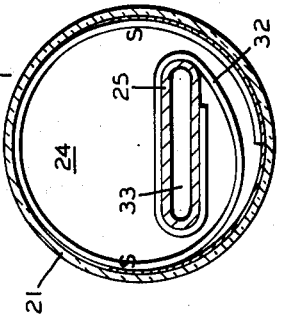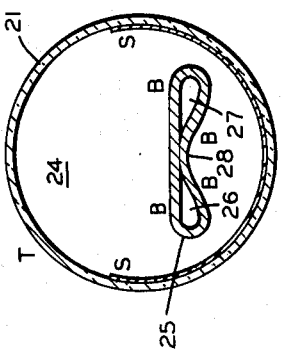
INVENTORS.
EDWARD SPEYER
SIEGFRIED GODEL
BY ARTHUR J. PLANTAMURA
ATTORNEY.

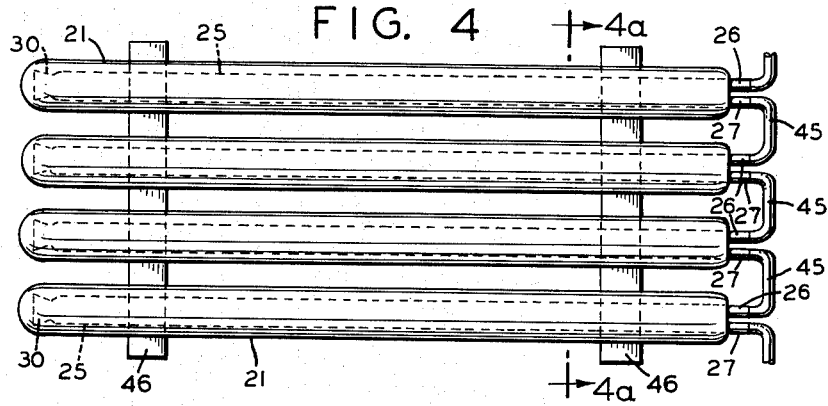
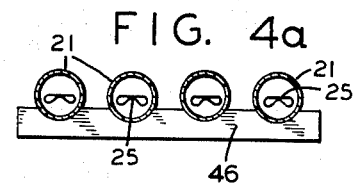
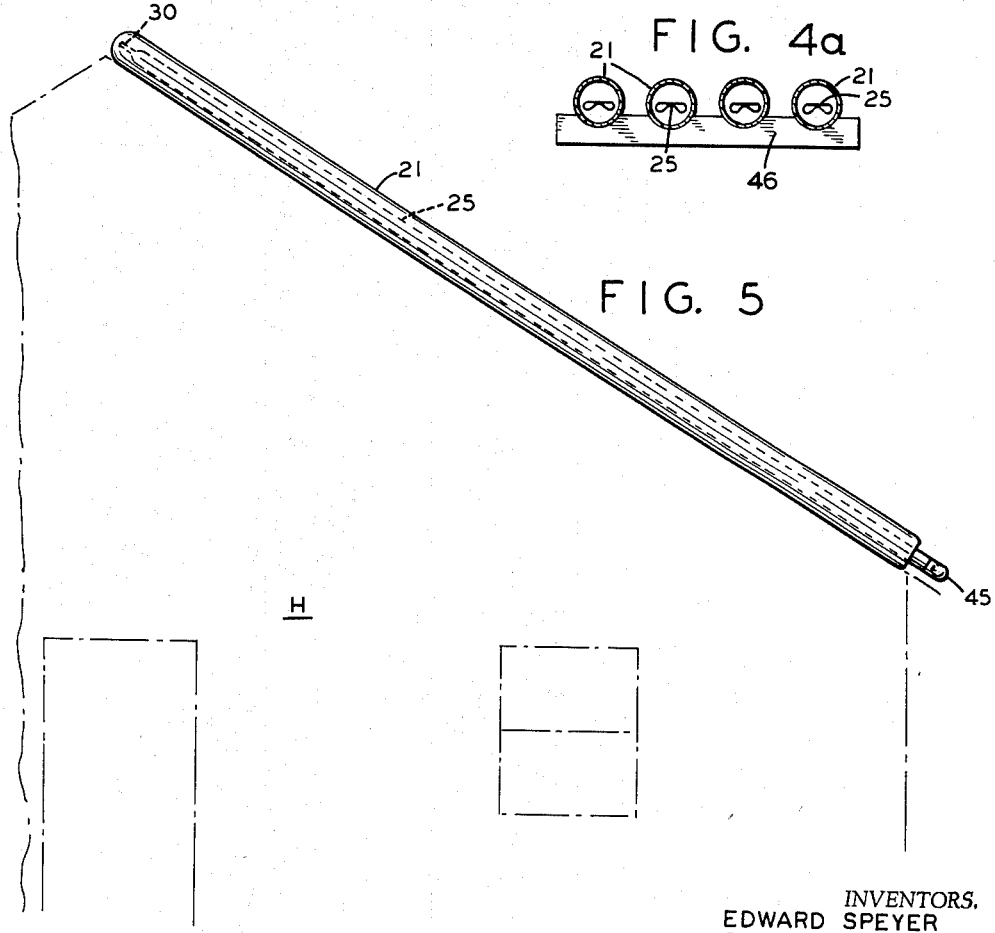

United States Patent Office 3,227,153
Patented Jan. 4, 1966

3,227,153
SOLAR COLLECTOR
Siegfried Godel and Edward Speyer, Norwalk, Conn., assignors to American Machine & Foundry Company, a corporation of New Jersey
Filed Sept. 4, 1963, Ser. No. 306,422
1 Claim. (Cl. 126—271)

This application is a continuation-in-part application of our copending application, S.N. 130,437, filed August 9, 1961, now abandoned.

This invention relates to solar energy collectors. More particularly, this invention relates to a relatively inexpensive module or unit of excellent efficiency which is useful in absorbing heat from solar energy. The collectors of this invention comprise a unit which includes essentially a transparent evacuated tube or envelope which is sealed at the factory such that when employed in situ the collector does not present a sealing problem because pipes or conduits carrying the liquid to be heated are connected to each other and to a pump by plumbing fittings external to the evacuated tube.

A solar energy collector intercepts a certain area of sunlight, that is, presents a certain area perpendicular to the direction of the sun. The blackened (energy absorbing) surface area of the collector, however, which actually absorbs the sunlight which enters the collector may be somewhat smaller than this.

In flat-plate collectors, the two areas are nearly equal, so that the ratio of the two, called the concentration ratio, generally has a value between 1 and 2. In solar furnaces, at the other extreme, the concentration ratio may have a value of several hundred.

Collectors with concentration ratios higher than 3 or 4 must track the sun to maintain efficiency, that is, change their position during the day. This requires a driving mechanism which makes the construction expensive. Flat-plate collectors, on the other hand, have not in the past generally produced high enough temperatures to be useful for the more desirable applications such as operating air-conditioning equipment, or for generating significant amounts of steam. Our invention overcomes this problem, by providing elements or modules that provide collectively the effect or equivalent of a flat-plate collector of superior performance characteristics.

The main problem heretofore obstructing the widespread use of flat-plate collectors and thus hindering diverse solar energy applications is the cost of the collectors. Collectors in most cases in the past have been designed to be hand-built, rather than mass-produced in modern factories. Our invention takes advantage of the mass production methods used in the glass bottle and tube manufacturing arts thus opening up certain commercial uses for solar energy which heretofore have been too high-priced to be competitive.

In accordance with the invention, collectors are made which incorporate the advantages of evacuated chambers for insulation above and below the absorbing layers of the collector. Such design permits an integrally formed unit in which the evacuated spaces are permanently sealed at the factory. The collector tubes are made preferably of glass and the conduits, contained within the tubes, of relatively thin-walled metal tubing, although conduits comprising glass as described in conjunction with FIG. 6 of the drawing are also contemplated. Of important practical advantage is the fact that the plumbing problem (at installation) is completely separated from that of sealing the evacuated chambers which is effected at the factory.

A perfect collector has no heat loss from the absorbing surface, that is, all the heat absorbed by the blackened surface remains in the surface or is passed into the fluid. The evacuation of the region around the absorbing surface to a pressure of $10^{-4}$ mm. of mercury, or less, completely eliminates convection heat loss from the absorbing surface, and very nearly eliminates the heat loss by conduction through the air. Evacuation under factory conditions permits vacuum of this order in the collector of the present invention. The only remaining heat losses are:

(1) Conduction through the conduit supports (illustrated in FIGS. 3 and 11); this loss is small because the cross-section of the supporting members is small.

(2) Radiation from the absorbing surface; this radiation loss is reduced by using a selectively black coating on the absorber. This remains, however, the largest cause of heat loss.

(3) Conduction along the conduit walls through the end of the evacuated tube. If the conduit is thin-walled, of steel rather than copper, and much longer than its cross-sectional dimensions, this heat loss will be small.

A valuable feature of our invention is that it may be utilized if desired so as to replace that portion, having greater exposure to the sun, of the roof of a conventional house, thus substantially defraying the cost of installation of the solar collector system. The collectors may be mounted directly on cross boards nailed on the rafters or may comprise modular structural unit comprising a plurality of collectors which are shipped and used preassembled (see FIGS. 4, 4a and 5). In such cases, the collectors, in fact, provide a much better insulated roof than one of conventional construction.

It is an object of this invention to provide a novel solar energy collector unit of simplified and practical construction.

It is another object of the invention to provide a novel inexpensive solar energy collector unit or module of excellent efficiency.

It is still another object of the invention to provide a solar collector unit of exceptional low cost relative to units heretofore proposed.

It is a further object of the invention to provide a solar energy collector of simple design and easy factory construction which requires a minimum of assembly at the sites where the collector is to be employed.

Other objects and advantages will become apparent from the following description considered in conjunction with the accompanying drawings in which:

FIG. 1 is a longitudinal view, partially in section, of the collector as seen by the sun.

FIG. 2 is a transverse section taken along the line 2—2 of FIG. 1.

FIG. 3 is a transverse section taken along the line 3—3 of FIG. 1, at a conduit support and positioner.

FIG. 4 shows a panel of collectors of the kind illustrated in FIG. 1, ready for installation.

FIG. 4a is a view taken along line 4a—4a of FIG. 4 illustrating the preassembled package containing a plurality of solar collectors.

FIG. 5 shows the collector panel of FIG. 4 installed on a roof.

FIG. 6 shows a collector of an alternative arrangement to that of FIG. 2.

FIGS. 7–10 show still other alternative arrangements of solar collector units within the contemplation of the invention.

FIG. 11 shows an alternative design for a conduit support and positioner.

FIG. 12 illustrates an alternate connection arrangement for the inlet end of the conduit into the vacuum chamber.

FIG. 13 is a view similar to FIG. 12 rotated 90 degrees.

Solar collectors which are designed to be exposed permanently to the weather must be sealed against dust and moisture. Since the seal must remain tight through a wide range of temperatures, the sealing problem has heretofore constituted a major difficulty. A vacuum tight seal is not very far beyond the dust-and-moisture requirements; however, the usual designs of flat-plate collectors do not provide sufficient strength to withstand atmospheric pressure on only one side, i.e. to withstand evacuation. Our design provides sufficient strength, and thus achieves the very considerable insulation advantages of evacuation, besides maintaining a practically perfect seal against dust and moisture. No one, to our knowledge, has considered the commercial production of an evacuated collector heretofore because of the cost of providing satisfactory strength and seal.

The construction of the collector of the present invention, as most fully detailed hereinafter, is such that it freely admits sun's rays while it substantially minimizes dissipation of heat from the collector other than through the liquid circulant. Water or other fluid is passed through the units under a suitable pressure to effect circulation. After being heated during circulation, the fluid or steam is discharged for application as a heat source or it may be used to drive an engine, distill water, make ice, or stored for subsequent tranformation into power or as a heat store.

Referring more particularly to the figures of the drawing in which like numerals refer to similar components, FIG. 1, the collector of the invention is constructed in the form of a transparent tube 21 which encloses an evacuated space 24 in which is suspended a conduit 25 for the inflow 26 and outflow 27 of the fluid being heated by the sun. The vacuum chamber 24, surrounds the conduit 25 and is substantially uninterrupted inside the entire tube 21. The fluid enters and exists at the same end, through suitable connections to the inflow and outflow channels to which the plumbing connections are attached. The closed end 30 of the conduit floats free, i.e. there is a space at 29 between the closed end 30 and the vacuum seal-off point 31 of the tube wall. This floating arrangement for the conduit 25 allows for differential thermal expansion and contraction between the conduit 25 and the tube 21. The fluid circulated through the conduit 25 flows in a U-shaped path through 26 reversing direction near the floating end at 33 returning via channel 27. At the entrant end, the conduit may be attached to a metal cap or dome 38 as by welding at 37. The dome 38 is in turn sealed to the tube 21. Optionally, as shown in FIGS. 12 and 13, the conduit may be brought out through glass envelope 21 without the use of the meal dome. When this construction is used, the open end of the metal conduit 25g is formed with a round shape at the point 36 where it penetrates the glass to facilitate the sealing operation and to provide a better seal. To separate the channels, 26 and 27, at the open end of the conduit, a suitable baffle or divider 46 may be employed.

Any suitable means such as metal clips 32 of diverse configurations may be utilized to support the conduit in an appropriate location in the tube 21.

In FIG. 6, the conduit 25a is double-walled, one wall being essentially cylindrical and within the other, which provides fins for the absorption of solar energy. In this embodiment, circulation is in at 26a, reversed at the closed free end of the conduit, and out at 27a. Where there is only a little clearance between the fin ends and the tube wall 21, it is more efficient to coat the underside of the conduit 25a with silver S rather than with black B.

In FIG. 7, two separate conduits 25b are provided with a covering sheet or strip 35 welded to the conduit channels and of blackened material which conducts heat to the conduits and the fluid. Preferably, these conduits 25b as well as strip 35 are formed of metal.

In FIG. 8, the inflow channel 26c is not adjacent to the outflow channel 27c, the channel being separated by fluid path divider portion 28c but both paths are contained as an integral part of a single element comprising the conduit 25c. This conduit as well as each of the various alternates illustrated in connection with FIGS. 2, 9 and 10 as well as additional configurations may be formed from a cylindrical tube closed at one end, e.g. by crimping as illustrated at 30 in FIG. 1, and shaped by suitable means known to those skilled in the art to provide divider 28 to produce the circulating in and out paths for the heat exchange fluid.

In FIG. 9, the design of the conduit 25d is asymmetrical, with a considerable fraction of the sun-light being reflected upward to the lower surface 40 of the conduit 25d.

In FIG. 10, the conduit 25e is mounted above the axis of the tube 21, so that oblique rays of sunlight or skylight cannot as easily leave the tube 21, i.e. avoid striking either the conduit 25e or the silvering S.

In FIG. 11, a view similar to that of FIG. 3 is shown, except that the conduit support and positioner 42 is made of two parts rather than one as 32 in FIG. 3. One part bonded to the upper surface at 43 of the conduit 25f and the other bonded to the lower surface at 44. In either design, tha is, that of FIG. 3 or FIG. 11, the positioner element 32 or 42 respectively may be a flexible metal wire or a flexible ribbon such as of spring steel.

In general, the lower half of the collector 21 is silvered S so that heat passing into the collector tube but not impinging on the conduit will be reflected toward the conduit. The fluid conduit is selectively blackened B such as by the method described by Tabor (see Tabor, Selective Radiation. I Wavelength Discrimination Bulletin of the Res. Coun. Israel, vol. 5A, 1956, pp. 119–128). Also further studies on Selective Black Coatings, H. Tabor, J. Harris and H. Weinberger United Nations Conference on New Sources of Energy, Apr. 21, 1961.

Other suitable configurations of the conduit will occur as a consequence of the teaching of the present invention to those who contemplate the geometrical and radiometric requirements for efficient collection, or capturing, of solar energy and of radiation from the sky. Similar considerations and computations will suggest various extents and boundaries for the silvered area S of the tube 21.

As shown in FIGS. 4 and 5, the units may be suitably employed as on a roof of a dwelling H and water or other fluid may be pumped under pressure such as through header pipes 45. Optionally, the solar collector units may be arranged so that the passage of water or other fluid follows a parallel route or any suitable variant alternate path such as one using a combination of series and parallel arrangements. Moreover, where the roof or other collector surface is of a length which makes a single collector impractical, two or more collectors may be arranged in tandem. Water or other fluid which is withdrawn after passing through the units may be used to furnish heat or stored in a known manner to be subsequently utilized as a source of heat, such as for the operation of an absorption cycle air conditioning system.

As shown in FIG. 4a, the solar collectors may be arranged so that a plurality of the collectors 21 are combined into an integral package affixed to supports 46 by any suitable means. The elements 46 may comprise wood metal solid or cellular plastic etc. In addition to its function as a mounting such supports may also serve as a shipping carton component which offers suitable protection for the collectors during shipment.

From the foregoing, it will be apparent that a variety of solar collectors are provided within our inventive concept. While only certain specific embodiments and details for the manufacture thereof have been described for illustrative purposes, it is evident that various changes and modifications may be made therein without departing from the spirit of the invention. In the appended claim, it is intended that all changes and modifications for those described incidental to the spirit of the invention be included as part of the invention.

What we claim is:

A flat plate solar collector comprising a sealed substantially cylindrical single-walled evacuated glass chamber, the wall of said chamber being uninterrupted except for the passage of a fluid flow conduit through which heat exchange fluid is circulated passing through and affixed to one end only of said chamber, a transparent portion comprising the upper part of said chamber to allow passage of sunlight into said chamber and a reflectant portion on the lower wall of said chamber to reflect sunlight passing through said transparent portion, a fluid flow conduit having a free end contained within said chamber and supported substantially co-extensively in spaced relationship, except for the entrant end, from the wall of said chamber, said conduit comprising a metal tube sealed at the free end and shaped with a central depression in the tube so as to provide longitudinally extending parallel fluid flow paths connected at the free end of the conduit, said conduit comprising a non-reflectant heat absorbent surface and defining within said chamber a fluid flow path having a substantially uniform cross section, and an inlet and outlet connection outside said chamber leading to said conduit, the ratio of the horizontal projected area of the transparent portion of said chamber to the horizontal projected area of said conduit being between 1 and 2.

References Cited by the Examiner

UNITED STATES PATENTS

| | | | |
|---|---|---|---|
| 1,068,650 | 7/1913 | Harrison | 126—271 |
| 1,837,449 | 12/1931 | Kunz | 126—271 |
| 1,855,815 | 4/1932 | Abbot | 126—271 |
| 1,946,184 | 2/1934 | Abbot | 126—271 |
| 2,133,649 | 10/1938 | Abbot | 126—271 |
| 2,906,257 | 9/1959 | Abbot | 126—271 |

FOREIGN PATENTS

| | | |
|---|---|---|
| 822,768 | 10/1959 | Great Britain. |
| 1,094,368 | 12/1954 | France. |

FREDERICK L. MATTESON, JR., *Primary Examiner.*

JAMES W. WESTHAVER, *Examiner.*